United States Patent [19]

Johnson et al.

[11] Patent Number: 4,910,909

[45] Date of Patent: Mar. 27, 1990

[54] FLY SWATTER DEVICE

[76] Inventors: Michael R. Johnson; Barbara A. Johnson, P.O. Box 8026, Granite City, Ill. 62040-8026

[21] Appl. No.: 381,463

[22] Filed: Jul. 18, 1989

[51] Int. Cl.[4] .............................................. A01M 3/02
[52] U.S. Cl. ...................................................... 43/137
[58] Field of Search ......................................... 43/137

[56] References Cited

U.S. PATENT DOCUMENTS

| | | | |
|---|---|---|---|
| 2,485,822 | 10/1949 | Goldrich | 43/137 |
| 3,905,146 | 9/1975 | Ralston | 43/137 |
| 4,617,754 | 10/1986 | Miley | 43/137 |
| 4,694,605 | 9/1987 | Garcia et al. | 43/137 |

FOREIGN PATENT DOCUMENTS 4400 of 1913 United Kingdom ................... 43/137

Primary Examiner—M. Jordan
Attorney, Agent, or Firm—Leon Gilden

[57] ABSTRACT

A fly swatter device is set forth wherein housing formed with an open upper end telescopingly receives a slide member interiorly thereof. The slide member is latched in a lower first position and extended to a second telescoping position. An array of striker slats is pivotally mounted to an axle orthogonally directed through opposed walls of the slide member utilizing an elastomeric cord to expand the slats to a splayed orientation upon the slide member extending to the second position.

8 Claims, 1 Drawing Sheet

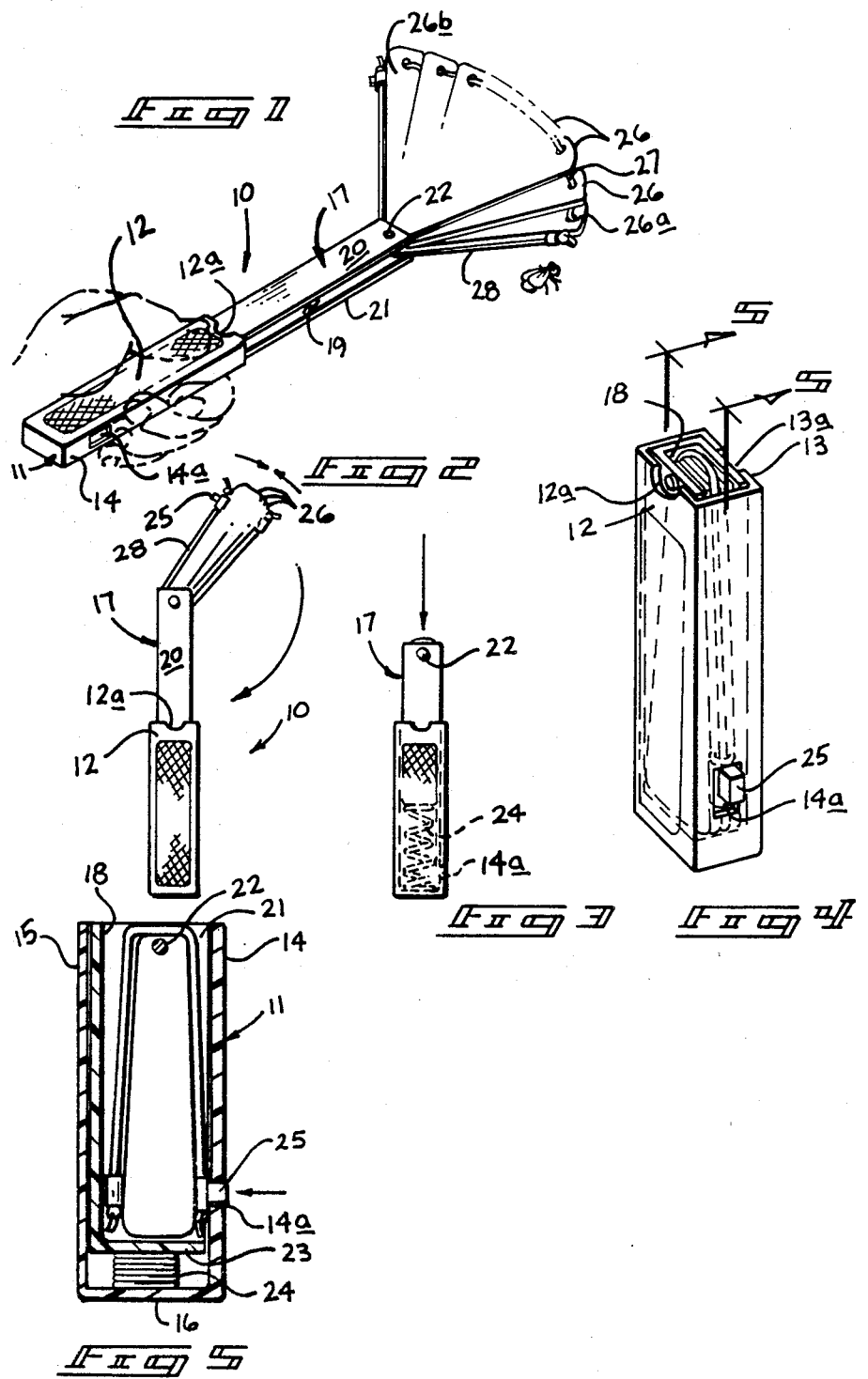

FLY SWATTER DEVICE

BACKGROUND OF THE INVENTION

1. Field of the Invention

The field of invention relates to fly swatters, and more particularly pertains to a new and improved fly swatter device wherein the same may be compactly stored during periods of non-use, and may be readily and accessibly extended for use by an individual.

2. Description of the Prior Art

Fly swatters of various types have been utilized in the prior art to rid an environmental area of flying insects. The organizations of the prior art have generally been of an expansive or elongate configuration not lending such structure for portability in transport such as in a purse or pocket by an individual. Examples of the prior art include U.S. Pat. No. 1,509,489 to Rochwite illustrating an elongate handle with an array of slats at a forward end thereof for striking of flying insects.

U.S. Pat. No. 1,966,954 to Monroe sets forth a similar elongate handle and forwardly positioned mount utilizing a series of striking portions formed forwardly thereof.

U.S Pat. No. 3,905,146 to Ralston sets forth a contractible fly swatter device wherein the arms or strikers are slidably received within a slide mechanism of a main housing member.

U.S. Pat. No. 4,120,114 to Little provides a fly swatter pad with an extendible handle for reaching a fly at a remote portion of an environment.

U.S. Pat. No. 4,694,605 to Garcia sets forth a switch device for swatting insects with a flexible forward portion telescopingly received within a housing member.

As such, it may be appreciated that there is a continuing need for a new and improved fly swatter device which addresses both the problems of portability and compactness of construction, and in this respect, the present invention substantially fulfills this need.

SUMMARY OF THE INVENTION

In view of the foregoing disadvantages inherent in the known types of fly swatters now present in the prior art, the present invention provides a fly swatter device wherein the same may be compactly stored during periods of non-use and may be readily extended for periods of need. As such, the general purpose of the present invention, which will be described subsequently in greater detail, is to provide a new and improved fly swatter device which has all the advantages of the prior art fly swatters and none of the disadvantages.

To attain this, the present invention comprises an elongate housing with a forward open end reciprocatingly receiving a slide member therewithin, with an elongate coil spring securing a floor of the slide member to an interior floor surface of the housing. The slide member includes an elongate, open side with an array of striker slats secured therewithin. The striker slats include a continuous connecting line securing the upper ends of the striker slats together to present an orderly array during a splayed orientation. An elastomeric cord is secured to an exterior side edge of a first striker slat extending around an axle pivotally mounting rear ends of the striker slats between top and bottom walls of the slide member to extend along an exterior side edge of a last striker slat in the array. The elastomeric cord biases the striker slats exteriorly of the open side of the slide member. Positioned adjacent and above the elastomeric cord on the last slat is a resilient latch button receivable within a lower opening of the housing when the slide member is in a retracted first position.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved fly swatter device which has all the advantages of the prior art fly swatters and none of the disadvantages.

It is another object of the present invention to provide a new and improved fly swatter device which may be easily and efficiently manufactured and marketed.

It is a further object of the present invention to provide a new and improved fly swatter device which is of a durable and reliable construction.

An even further object of the present invention is to provide a new and improved fly swatter device which is susceptible of a low cost of manufacture with regard to both materials and labor, and which accordingly is then susceptible of low prices of sale to the consuming public, thereby making such fly swatter devices economically available to the buying public.

Still yet another object of the present invention is to provide a new and improved fly swatter device which provides in the apparatuses and methods of the prior art some of the advantages thereof, while simultaneously overcoming some of the disadvantages normally associated therewith.

Still another object of &he present invention is to provide a new and improved fly swatter device wherein the same enables compact retracted storage in a first retracted position and is accessible to a second position to provide an array of striker slats in an extended orientation relative to a housing.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is a top orthographic view of the instant invention illustrating the slats extending to an operative configuration.

FIG. 3 is a top orthographic view of the instant invention with the slide member telescopingly directed interiorly of the housing.

FIG. 4 is an isometric illustration of the instant invention in a retracted configuration.

FIG. 5 is an orthographic view taken along the lines 5—5 of FIG. 4 in the direction indicated by the arrows.

DESCRIPTION OF THE PREFERRED EMBODIMENT

With reference now to the drawings, and in particular to FIGS. 1 to 5 thereof, a new and improved fly swatter device embodying the principles and concepts of the present invention and generally designated by the reference numeral 10 will be described.

More specifically, the fly swatter device 10 essentially comprises an elongate housing 11 with generally rectangular parallelepiped configuration. The housing 11 comprises a bottom wall 12 spaced from and parallel to a top wall 13 with a first arcuate recess 12a and a second arcuate recess 13a aligned relative to one another and formed within respective top and bottom walls 12 and 13 of the housing at forward portions thereof. A right side wall 14 is spaced from and parallel to a left side wall 15 with a bottom wall 16 formed remote from the recesses 12a and 13a. A slide member 17 is reciprocatably mounted within the housing 11 and is formed with a first solid side wall 18 spaced from a coextensive rectangular opening 19 defined between a top slide wall 20 and bottom slide wall 21 that are spaced relative to one another and aligned relative to each other. An axle 22 is orthogonally directed adjacent upper edges of the top and bottom slide walls 20 and 21 remote from a bottom slide wall 23. A coil spring 24 is secured to an exterior surface of the bottom slide wall 23 and to an upper surface of the bottom wall 16 of the housing member 11. A spring-biased latch button 25 is normally received through an opening 14a orthogonally directed through the right side wall 14, wherein the opening 14a is positioned adjacent the bottom wall 16 along the right side wall. The opening 14a cooperates with the spring-biased latch button 25 mounted to an edge of a last slat 26b of an array of striker slats 26 that are pivotally mounted to the axle 22 proximate their lower terminal ends. A continuous connecting line 27 is directed adjacent upper terminal ends of each of the slats 26 to maintain the slats in an orderly arranged orientation relative to one another when in a splayed configuration, as illustrated in FIG. 1. An elongate elastomeric cord 28 is fixedly secured to a side edge adjacent a forward terminal end of the first slat 26a and extends about the axle 22 and directed through the rectangular opening 19 where it is directed along the exterior edge of the last slat 26b, as illustrated in FIG. 1, FIG. 2, and FIG. 5. The spring-biased latch button 25 is positioned above and adjacent the fixed end of the elastomeric cord 28 on the exterior edge of the last slat 26b.

In a first contracted orientation, the slats 26 are pivoted as a unit interiorly of the slide member 20, whereupon the slide member 20 is reciprocatably received within the housing 11 whereupon the spring-biased latch button 25 aligns with the opening 14a to secure the slide member and slats in the first configuration. Upon depressing of the latch button 25, the slide member 17 is extended by means of the energy directed from the coil spring 24 to an extended second position and the slats 26 will pivot outwardly, as illustrated in FIG. 2, whereupon the tendency of the elastomeric cord 28 to contract will open the slats to a splayed configuration, as illustrated in FIG. 1.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A fly swatter device comprising,
   an elongate housing defined by an interior cavity wherein the housing is open at one end and includes a bottom wall at the opposed end with a top wall spaced above and aligned with a bottom wall, and
   a right side wall spaced and aligned with a left side wall, and
   a slide member telescopingly received within the cavity defined by the housing with an array of superimposed slats pivotally mounted to the slide member, and
   latch means to secure the slide member in a first retracted position within the housing and wherein the latch member is depressed to enable extension of the slide member to a second extended position relative to the housing.

2. A fly swatter device as set forth in claim 1 wherein the elongate housing includes a first arcuate recess formed at an uppermost end of the top wall adjacent the open end with an aligned second arcuate recess formed at an upper terminal end of the bottom wall of the housing adjacent the open end, and wherein the slats are pivotally mounted to the slide member including an axle orthogonally directed through top and bottom slide walls of the slide member, wherein the axle is received within the first and second arcuate recess when the slide member is in the first position.

3. A fly swatter device as set forth in claim 2 further including an aperture formed through the right side wall of the housing adjacent the bottom wall, and wherein the latch means includes a spring-biased button integrally secured to a side edge and received through the aperture in the first position.

4. A fly swatter device as set forth in claim 3 wherein the slide member includes a bottom wall, and a side wall, the side wall spaced from an elongate rectangular opening wherein the slats are receivable, and further including a coil spring integrally secured between an upper surface of the bottom wall of the housing and an exterior surface of the bottom wall to the slide member to bias the slide member in the second extended position relative to the housing.

5. A fly swatter device as set forth in claim 4 wherein the slats include a series of slat members including a first slat and a last slat with a plurality of slats therebetween, and the latch button is integrally secured to the last slat, and further including an elastomeric cord integrally secured to an edge of the first slat, and wherein the elastomeric cord extends interiorly of the slide member about the axle and extends along the last slat adjacent the latch button.

6. A fly swatter device as set forth in claim 5 wherein the slide member is of a cross-sectional configuration substantially equal to that of a further cross-sectional configuration defined by the cavity of the housing.

7. A fly swatter device as set forth in claim 6 wherein the slide member defines a further cavity and the slats are receivable within the further cavity when the slide member is in a first retracted position.

8. A fly swatter device as set forth in claim 7 further including a continuous flexible connecting line interconnecting the slats, and wherein the flexible line is secured through each slat adjacent forward terminal ends of each slat.

* * * * *